(12) United States Patent
Fan et al.

(10) Patent No.: US 10,143,996 B2
(45) Date of Patent: Dec. 4, 2018

(54) SUPER ABSORBENT THERMOCHROMIC RESIN AND PREPARATION METHOD THEREOF

(71) Applicant: SHANGHAI CHUANGSHI INDUSTRY GROUP CO.,LTD., Shanghai (CN)

(72) Inventors: Litao Fan, Shanghai (CN); Yong You, Shanghai (CN); Yan Li, Shanghai (CN)

(73) Assignee: SHANGHAI CHUANGSHI INDUSTRY GROUP CO., LTD., Shanghai (CN)

( * ) Notice: Subject to any disclaimer, the term of this patent is extended or adjusted under 35 U.S.C. 154(b) by 0 days.

(21) Appl. No.: 15/553,950

(22) PCT Filed: Apr. 28, 2017

(86) PCT No.: PCT/CN2017/082344
§ 371 (c)(1),
(2) Date: Aug. 25, 2017

(87) PCT Pub. No.: WO2017/186155
PCT Pub. Date: Nov. 2, 2017

(65) Prior Publication Data
US 2018/0169615 A1    Jun. 21, 2018

(30) Foreign Application Priority Data

Apr. 29, 2016   (CN) .......................... 2016 1 0282041

(51) Int. Cl.
| | | |
|---|---|---|
| *B01J 20/26* | (2006.01) | |
| *B01J 20/30* | (2006.01) | |
| *C08F 220/06* | (2006.01) | |
| *C08F 220/44* | (2006.01) | |
| *C08F 220/56* | (2006.01) | |
| *C08F 222/14* | (2006.01) | |
| *C08F 226/10* | (2006.01) | |
| *C08F 236/20* | (2006.01) | |
| *C08F 236/22* | (2006.01) | |

(52) U.S. Cl.
CPC ......... *B01J 20/267* (2013.01); *B01J 20/3085* (2013.01); *C08F 220/06* (2013.01); *C08F 220/44* (2013.01); *C08F 220/56* (2013.01); *C08F 222/14* (2013.01); *C08F 226/10* (2013.01); *C08F 236/20* (2013.01); *C08F 236/22* (2013.01)

(58) Field of Classification Search
CPC ........................... B01J 20/267; B01J 20/3085
USPC ....................................................... 524/123
See application file for complete search history.

(56) References Cited

U.S. PATENT DOCUMENTS

2013/0164242 A1* 6/2013 Tamareselvy ........ A61K 8/8152
                                                                    424/70.7

* cited by examiner

*Primary Examiner* — Ling Siu Choi
*Assistant Examiner* — Ronald Grinsted

(57) ABSTRACT

A super absorbent thermochromic resin and a preparation method thereof are disclosed. The resin comprises the following components by weight percent: 30-60% of a monomer, 0.01-0.5% of an initiator, 0.01-4% of a dispersant, 0.01-5% of a cross-linking agent, 0-20% of a diluent, 0.5-2% of an auxiliary, 0.1-10% of a thermochromic pigment, and the balance of water. Compared with the prior art, the super absorbent thermochromic resin prepared by the present invention can effectively indicate the temperature changes of the resin in a drying state and a water absorption state through color changes. The reaction finishes in 6-10 min, with a simple process, smooth polymerization, short reaction time and high productivity. The super absorbent thermochromic resin has a good stability and can be widely applied to the medical industry and daily use articles industry.

14 Claims, No Drawings

SUPER ABSORBENT THERMOCHROMIC RESIN AND PREPARATION METHOD THEREOF

CROSS REFERENCE OF RELATED APPLICATION

This is a U.S. National Stage under 35 U.S.C 371 of the International Application PCT/CN2017/082344, filed Apr. 28, 2017, which claims priority under 35 U.S.C. 119(a-d) to CN 201610282041.3, filed Apr. 29, 2016.

BACKGROUND OF THE PRESENT INVENTION

Field of Invention

The present invention belongs to the technical field of functional polymer materials and relates to a thermochromic water-absorbent resin polymer and a preparation method thereof.

Description of Related Arts

As a new kind of polymer material, super absorbent resin can absorb water ten to thousands of times more than its mass, and has a good water retention capacity under pressure or heat conditions. The super absorbent resin after water absorption has rubber-like elasticity and good thermal storage performance, and is highly safe and nontoxic. In addition, it is widely used in medicine, physical health, rehabilitation and other fields.

There is little discussion on the thermochromic water-absorbent resin in the current literature, and the conventional water-absorbent resin products available on the market have no thermochromic function. Thermochromic water-absorbent resin, based on the original water-absorbent resin, has a new function of indicating temperature changes through color changes, so as to indicate safe use to users with suitable thermochromic function and increase the interest of the products, thereby improving the safe and enjoyable experience of the products.

The conventional water-absorbent resin products on the market have no thermochromic function. The reason is that the thermochromic material is unstable and easy to agglomerate in polymerization reaction systems, or the thermochromic function loses due to initiator and high temperature. The above-mentioned problems cannot be solved, even though conventional thermochromic microcapsules are used. Therefore, it is difficult to prepare thermochromic water-absorbent resin.

SUMMARY OF THE PRESENT INVENTION

In view of the above technical defects, an object of the present invention is to provide a super absorbent thermochromic resin and a preparation method thereof.

The object of the present invention is realized by means of the following technical solution:

In a first aspect, the present invention provides a super absorbent thermochromic resin, which comprises following components by weight percent:

| | |
|---|---|
| a monomer | 30-60%; |
| an initiator | 0.01-0.5%; |
| a dispersant | 0.01-4%; |
| a cross-linking agent | 0.01-5%; |
| a diluent | 0-20%; |
| a thermochromic pigment | 0.1-10%; | and a balance of water.

The conventional water-absorbent resin only has a high water absorption function. By adding a thermochromic material to improve the formula, a new water-absorbent resin with the function of thermochromism is prepared after thorough mixing and reaction, thereby reminding users of temperature changes to the new water-absorbent resin and preventing the users from being burned or frostbite.

Further preferably, the thermochromic water-absorbent resin composition comprises the following components by weight percent:

| | |
|---|---|
| the monomer | 40-55%; |
| the initiator | 0.05-0.3%; |
| the dispersant | 0.4-3.5%; |
| the cross-linking agent | 0.1-4.5%; |
| the diluent | 0.4-15.8%; |
| the thermochromic pigment | 4-7.5%; | and the balance of water.

The above percentages refer to the weight percentage of specific components in the obtained super absorbent thermochromic resin.

The super absorbent thermochromic resin prepared using conventional methods shows poor discoloration. By adjusting the proportion of each raw material in the formula, the super absorbent thermochromic resin after water absorption shows obvious color changing upon temperature rise or cooling.

Further preferably, the super absorbent thermochromic resin comprises the following components by weight percent:

| | |
|---|---|
| the monomer | 40-55%; |
| the initiator | 0.05-0.3%; |
| the dispersant | 0.4-3.5%; |
| the cross-linking agent | 0.1-4.5%; |
| the diluent | 0.4-15.8%; |
| the thermochromic pigment | 4-7.5%; |
| the auxiliary | 0.5-2%; | and the balance of water.

The addition of an auxiliary in the process of synthesizing water-absorbent resin can overcome the problem of poor ductility and fragility of the conventional water-absorbent resin, and greatly improve the user's comfort.

Preferably, the water is deionized water or distilled water.

Preferably, the monomer comprises an acrylic monomer, which is specifically selected from a group consisting of acrylamide, acrylate, acrylic acid, vinyl acetate, N-vinyl pyrrolidone, acrylonitrile, methacrylic acid, methacrylate and an acrylate system as shown in the following structural formula I.

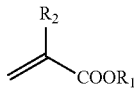

wherein, R1 is C1-C5, R2 is H or C1.

More preferably, the monomer is one or two of acrylate and acrylamide; both are the acrylic monomer with a good hydrophilicity; copolymers formed by the two have good mechanical properties after water absorption, and is beneficial to dispersion of the thermochromic pigment.

Preferably, the initiator is selected from a group consisting of azobisisobutyronitrile (AIBN), cerium salts, persulfate, a persulfate-$NaHSO_3$ system and a hydrogen peroxide-ascorbic acid system.

More preferably, the initiator is selected from persulfate; further, the dispersant is $Na_2S_2O_8$; a decomposition product is $Na_2SO_4$, which exerts a lowest impact on the thermochromic water-absorbent resin, greatly speeds up the reaction and obtains the product.

Preferably, the dispersant is selected from a group consisting of Span 60, Tween 80, Tween 85 and nonylphenol polyoxyethylene ether-10 (OP-10). Selecting proper dispersant may allow uniform dispersion of the thermochromic pigment free of agglomeration and make discoloration of the product more obvious.

Preferably, the cross-linking agent is selected from a group consisting of ethylene glycol dimethacrylate, diethylene glycol dimethacrylate, allyl methacrylate, 1,1,1-trimethylolpropane acrylate, N,N'-methylene diacrylamide, triallylamine and tetraallyloxyethane.

Preferably, the diluent is mainly polyhydric alcohol;

More preferably, the diluent is selected from a group consisting of glycerol, pentaerythritol, trimethylol ethane, propylene glycol and diethylene glycol.

Preferably, the auxiliary is at least one of inorganic salts and organic compounds; the inorganic salts comprise one or more of sodium tripolyphosphate, zinc sulfate, potassium aluminum sulfate, sodium chloride and potassium chloride, and the organic compounds comprise at least one of polyethylene glycol (200-6000) and polyethylene glycol glyceride. The addition of the auxiliary effectively improves the ductility and hardness of the product.

Preferably, the thermochromic pigment is a water dispersion type reversible thermochromic microcapsule pigment/dye. The color classification of dye is as follows: blue, orange, red, green, carmine and black; a temperature for discoloration ranges between −15° C. and 70° C.; a common temperature is −5° C., 0° C., 5° C., 15° C., 31° C., 43° C. and 55° C. High, medium and low-temperature segmented discoloration of water-absorbent resin through mutual collocation or collocation with other background pigments can be realized. For example: two-segmented discoloration effect can be realized by mixing thermochromic dye with a temperature below 0° C. and thermochromic dye with a temperature above 50° C., while three-segmented discoloration effect can be realized by mixing thermochromic dye with a temperature below 0° C., thermochromic dye with a temperature above 31° C. and thermochromic dye with a temperature above 50° C.

In a second aspect, the present invention provides a preparation method of a super absorbent thermochromic resin, wherein the preparation method comprises following steps of: adding a thermochromic pigment, a dispersant, a cross-linking agent and a diluent to a monomer and mixing uniformly; adjusting a pH value, and adding an initiator; mixing uniformly to form a reaction system, controlling a reaction temperature to perform reaction, and obtaining the super absorbent thermochromic resin.

Preferably, the present invention preliminarily mixes and disperses the thermochromic pigment and the dispersant, and then transfers it into the monomer to uniformly mix them, effectively solving the phenomenon of internal agglomeration of pigment after the super absorbent thermochromic resin is produced.

Preferably, the mode of mixing uniformly includes stirring.

Preferably, the step of adjusting the pH value is specifically adding an alkali solution.

Preferably, the pH value after being adjusted is 5-9.

Further preferably, the pH value after being adjusted is 6-8. Due to the electrical properties of the thermochromic dye, a too high or too low pH value will cause the precipitation and agglomeration of the thermochromic pigment. By adjusting the pH value, the agglomeration of the thermochromic pigment can be avoided.

Preferably, the reaction temperature is controlled at 55-90° C.

Further preferably, the reaction temperature is controlled at 65-85° C. The microcapsule structure of the thermochromic pigment will be damaged due to a too high reaction temperature, so that the pigment fades or loses the discoloration effect. By adjusting the reaction temperature, the loss of discoloration caused by high temperature can be avoided. The temperature indication range of the polymer of this invention varies depending on the thermochromic pigment. The commonly adopted use temperature of the thermochromic water-absorbent resin is −15-70° C., preferably, the temperature indication range is −10-10° C., 30-35° C. and 50-55° C.; specifically: the temperature of below −5° C. easily causes frostbite, and the temperature of above 50° C. easily causes burns of a sensitive person, therefore, the temperatures within the range of −10-10° C. and 50-55° C. are reminder alerts.

Compared with the prior art, the present invention has the following beneficial effects:

1. In the present invention, by adding water dispersion type reversible thermochromic microcapsule pigment/dye to the original monomer and improving the addition proportion of each raw material in the original formula, a super absorbent thermochromic resin is obtained. Before and after water absorption, the resin has a significant color change, which preventing users from being burned at high temperatures or frostbite at low temperatures, and has a high water absorption function.

2. In the present invention, selecting a proper dispersant and adding thermochromic pigment and dispersant mixed in the experimental steps to the monomer effectively solves the problem that the thermochromic pigment is unstable and easy to agglomerate. As a result, the product, namely super absorbent thermochromic resin, is significant in thermochromism and achieves a good indication effect.

3. In the present invention, by changing the reaction temperature for production, it is possible to find a balance between the reaction temperature and the temperature affecting the thermochromic pigment, thereby effectively preventing thermochromic pigment from loss of thermochromism caused by high temperature and keeping the production normal.

4. In the present invention, by adding the initiator, it is possible to shorten the reaction time to only 6-10 min, and it is not necessary to fill with nitrogen, thereby overcoming such problems as low reaction rate and yield.

5. In the present invention, the added auxiliary can change the function of the polymerization bond in the polymerization of the monomer, and the temperature-sensitive phase transition microcapsules are stably present in the polymer, and the agglomerate structure of the polymer can be changed to increase the ductility and hardness of the product.

DETAILED DESCRIPTION OF THE PREFERRED EMBODIMENT

The present invention is described in detail as follows with reference to specific embodiments. The following embodiments will help provide further understanding of the present invention for those skilled in the art, and not in any way limit the present invention. It shall be noted that several variants and improvements can be made without departing from concept of the present invention for ordinary persons skilled in the art. All these fall within the protection scope of the present invention.

Embodiment 1

The embodiment provides a super absorbent thermochromic resin and a preparation method thereof, wherein components and contents involved are shown in Table 1; and the preparation method comprises the following steps of:

adding 30 g of acrylic acid to water; adjusting the solution with NaOH until pH=6.5; feeding nitrogen into a reactor; adding 0.4 g of Tween 60, 0.2 g of ethylene glycol dimethacrylate and 4 g of thermochromic dye (color changes from blue to colorless at −5° C. and the process is reversible upon temperature drop); stirring, keeping feeding nitrogen for 2 hours, and then adding 0.02 g of $Na_2S_2O_8$ to a mixed liquor; performing heat preservation on an obtained reaction system (a total of 100 g) at 80° C. for 10 minutes to perform a polymerization reaction; cooling to room temperature, and then using a scraper for removing a gel from the reactor; drying the gel in an oven at 70° C.; and grinding the gel.

Embodiment 2

The embodiment provides a super absorbent thermochromic resin and a preparation method thereof, wherein components and contents involved are shown in Table 1; and the preparation method comprises the following steps of:

stirring and mixing 38 g of acrylic acid, 2 g of acrylonitrile, 0.5 g of OP-10 and 2 g of pentaerythritol with deionized water; adding 20 g of 9% NaOH for regulating the system pH to 5.5; adding 0.5 g of diethylene glycol dimethacrylate and 4 g of thermochromic dye (color changes from yellow to colorless at 30° C. and the process is reversible upon temperature drop); stirring, feeding $N_2$ for 2 hours, and then adding 0.03 g of AIBN to the mixture; stirring uniformly (the reaction system totals 100 g), and then using an industrial white oil with a temperature of 80° C. as a continuous phase and using the mixture as a dispersed phase for suspension polymerization; stirring for 15 minutes, and then filtering the white oil to obtain resin particles; using tetrahydrofuran to wash away the white oil on the surfaces of the resin particles; and drying in a vacuum drying oven at 80° C. to obtain water-absorbent resin microbeads.

Embodiment 3

The embodiment provides a super absorbent thermochromic resin and a preparation method thereof, wherein components and contents involved are shown in Table 1; and the preparation method comprises the following steps of:

adding 30.5 g of acrylic acid to 15 g of 9% NaOH solution to obtain a mixture a; adding 17 g of acrylamide, 2.5 g of N-vinyl pyrrolidone, 3 g of glycerol, 4 g of thermochromic pigment (color changes from green to yellow green at 45° C. and the process is reversible upon temperature drop), 0.7 g of triallylamine, 0.3 g of Tween 80, 0.4 g of OP-10 to deionized water to obtain a mixture b; mixing the mixture a and mixture b and stirring uniformly to obtain a mixture c; feeding $N_2$ into the mixture c for 2 hours, and then adding 1 g of 2% (by mass) ceric ammonium nitrate solution; mixing uniformly (the reaction system totals 100 g), and then heating for 10 minutes in 80° C. water bath; after cooling, using a scraper for removing a gel from the reaction system; placing in an oven at 80° C. for 10 minutes, and then crushing to obtain the thermochromic water-absorbent resin powder.

Embodiment 4

The embodiment provides a super absorbent thermochromic resin and a preparation method thereof, wherein components and contents involved are shown in Table 1; and the preparation method comprises the following steps of:

adding 40 g of acrylic acid to 30 g of 5% NaOH solution, adjusting the solution until pH=4, and then adding 17 g of acrylamide, 3 g of vinyl acetate, 4 g of thermochromic pigment (color changes from red to colorless at 55° C. and the process is reversible upon temperature drop), 4 g of glycerol, 0.6 g of Tween 60, 0.6 g of OP-10 and 0.78 g of allyl methacrylate; continuously stirring and feeding $N_2$; after 2 hours, adding 0.01 mL of 30% hydrogen peroxide and 0.01 g of L-ascorbic acid, and using an industrial white oil as a continuous phase and using the above-mentioned mixture (a total of 100 g) as a dispersed phase for performing suspension polymerization at 75° C.; filtering after 10 minutes, and washing the filtrate with petroleum ether, and drying at 75° C. to obtain the thermochromic water-absorbent resin (water contained in the NaOH solution).

Embodiment 5

The embodiment provides a super absorbent thermochromic resin and a preparation method thereof, wherein components and contents involved are shown in Table 1; and the preparation method comprises the following steps of:

adding 30 g of acrylic acid to 25 g of 5% NaOH solution, adjusting the solution until pH=6, and then adding 15 g of acrylamide, 4 g of thermochromic pigment (color changes from dark purple to light purple to red and then colorless at 0° C., 30° C. and 55° C.), 0.4 g of Span 60, 0.6 g of OP-10 and 2 g of polyethylene glycol and 0.5 g ethylene glycol dimethacrylate; continuously stirring and feeding $N_2$; after 2 hours, adding 0.02 g of $Na_2S_2O_8$ to, and using an industrial white oil as a continuous phase and using the above-mentioned mixture (a total of 100 g) as a dispersed phase for performing suspension polymerization at 75° C.; filtering after 10 minutes, and washing the filtrate with petroleum ether mixed with tetrahydrofuran (1:1), and drying at 75° C. to obtain the thermochromic water-absorbent resin (water contained in the NaOH solution).

Embodiment 6

The embodiment provides a super absorbent thermochromic resin and a preparation method thereof, wherein components and contents involved are shown in Table 1; and the preparation method comprises the following steps of:

mixing 4 g of thermochromic dye (color changes from bright orange to orange red to red and then colorless at −5°

C., 30° C. and 55° C.) with 0.3 g of Span first; mixing and stirring 35 g of acrylic acid, 0.4 g of Tween 85, 5 g of propylene glycol and deionized water, adding 22 g of 10% NaOH to adjust the system until pH=5.5, adding 1.3 g of polyethylene glycol glyceride, 0.9 g of N'N-methylenebisacrylamide and stirring them, feeding $N_2$ for 2 hours, and then adding 0.01 g of potassium persulfate to the mixture; stirring uniformly (the reaction system totals 100 g), and then using an industrial white oil with a temperature of 80° C. as a continuous phase and using the mixture as a dispersed phase for suspension polymerization; stirring for 15 minutes, and then filtering the white oil to obtain resin particles; using tetrahydrofuran to wash away the white oil on the surfaces of the resin particles; and drying at 80° C. to obtain spherical water-absorbent resin.

Embodiment 7

Embodiment 7 provides a thermochromic water-absorbent resin composition and a preparation method thereof, wherein components and contents involved are shown in Table 1; and the preparation method is basically the same as that of Embodiment 2, with the difference being the addition of 0.8 g of zinc sulfate as the auxiliary.

Embodiment 8

Embodiment 8 provides a super absorbent thermochromic resin and a preparation method thereof, wherein components and contents involved are shown in Table 1; and the preparation method is basically the same as that of Embodiment 3, with the difference being the addition of 1.3 g of sodium chloride as the auxiliary and 4 g of thermochromic dye (color changes from purple to blue to red and then colorless at 0° C., 30° C. and 55° C.).

TABLE 1

Components and Contents Involved in Embodiments 1-8

| | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|
| Monomer | 30% acrylic acid | 38% acrylic acid 2% acrylonitrile | 30.5% acrylic acid 17% acrylamide 2.5% N-vinyl pyrrolidone | 40% acrylic acid 17% acrylamide 3% vinyl acetate | 30% acrylic acid 15% acrylamide | 35% acrylic acid | 38% acrylic acid 2% acrylonitrile | 30.5% acrylic acid 17% acrylamide 2.5% N-vinyl pyrrolidone |
| Initiator | 0.02% $Na_2S_2O_8$ | 0.03% AIBN | 0.02% ceric ammonium nitrate | 0.02% hydrogen peroxide-ascorbic acid | 0.02% $Na_2S_2O_8$ | 0.01% potassium persulfate | 0.03% AIBN | 0.02% ceric ammonium nitrate |
| Diluent | 0 | 2% pentaerythritol | 3% propylene glycol | 4% glycerol | 0 | 5% propylene glycol | 2% pentaerythritol | 3% propylene glycol |
| Dispersant | 0.4% Tween 60 | 0.5% OP-10 | 0.3% Tween 80 0.4% OP-10 | 0.6% OP-10 0.6% Tween 60 | 0.6% OP-10 0.4% Span 60 | 0.3% Span 60 0.4% Tween 85 | 0.5% OP-10 | 0.3% Tween 80 0.4% OP-10 |
| Cross-linking agent | 0.2% ethylene glycol dimethacrylate | 0.5% diethylene glycol dimethacrylate | 0.7% triallylamine | 0.78% allyl methacrylate | 0.5% ethylene glycol dimethacrylate | 0.9% N'N-methylen ebisacrylamide | 0.5% diethylene glycol dimethacrylate | 0.7% triallylamine |
| Auxiliary | | | | | 2% polyethylene glycol | 1.3% polyethylene glycol glyceride | 0.8% zinc sulfate | 1.3% sodium chloride |
| Thermochromic pigment | 4% Co., Ltd., color changes from blue to colorless at −5° C. and the process is reversible upon temperature drop) | 4% color changes from yellow to colorless at 30° C. and the process is reversible upon temperature drop) | 4% color changes from green to yellow green at 45° C. and the process is reversible upon temperature drop) | 4% color changes from red to colorless at 55° C. and the process is reversible upon temperature drop | 4% color changes from dark purple to light purple to red and then colorless at 0° C., 30° C. and 55° C.) | 4% color changes from bright orange to orange red to red and then colorless at −5° C., 30° C. and 55° C.) | 4% color changes from yellow to colorless at 30° C.) | 4% color changes from purple to blue to red and then colorless at 0° C., 30° C. and 55° C.) |
| Deionized water (distilled water) | Balance | Balance | Balance | Balance | Balance | Balance | Balance | Balance |

See Table 2 for the performance test results of compositions in Embodiments 1-4:

TABLE 2

Performance Test of Compositions Obtained in Embodiments 1-4

| | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|
| Color uniformity after water absorption of resin | Colorless at 25° C. | Yellow at 25° C. | Green at 25° C. | Red at 25° C. | Light purple at 25° C. | Orange red at 25° C. | Yellow at 25° C. | Blue at 25° C. |
| The thermochromic performance after water absorption of resin | Blue when the ambient temperature is below −5° C., colorless when the ambient temperature is above −5° C. (not exceeding 90° C.) | Yellow when the ambient temperature is below 30° C., colorless when the ambient temperature is above 30° C. (not exceeding 90° C.) | Green when the ambient temperature is below 45° C., yellow green when the ambient temperature is above 45° C. (not exceeding 90° C.) | Red when the ambient temperature is below 55° C., colorless when the ambient temperature is above 55° C. (not exceeding 90° C.) | Dark purple when the ambient temperature is below 0° C., light purple when the ambient temperature is above 0° C. and below 30° C., red when the ambient temperature is above 30° C. and below 55° C. and colorless when the ambient temperature is above 55° C. (not exceeding 90° C.) | Bright orange when the ambient temperature is below −5° C., orange red when the ambient temperature is above −5° C. and below 30° C., red when the ambient temperature is above 30° C. and below 55° C. and colorless when the ambient temperature is above 55° C. (not exceeding 90° C.) | Yellow when the ambient temperature is below 30° C., colorless when the ambient temperature is above 30° C. (not exceeding 90° C.) | Purple when the ambient temperature is below 0° C., blue when the ambient temperature is above 0° C. and below 30° C., red when the ambient temperature is above 30° C. and below 55° C. and colorless when the ambient temperature is above 55° C. (not exceeding 90° C.) |
| The thermochromic performance after naturally aging for 100 hours at 25° C. after water absorption of resin | No significant changes in the thermochromic performance | No significant changes in the thermochromic performance | No significant changes in the thermochromic performance | No significant changes in the thermochromic performance | No significant changes in the thermochromic performance | No significant changes in the thermochromic performance | No significant changes in the thermochromic performance | No significant changes in the thermochromic performance |
| The thermochromic performance after naturally aging for 200 hours at 25° C. after water absorption of resin | No significant changes in the thermochromic performance | No significant changes in the thermochromic performance | No significant changes in the thermochromic performance | No significant changes in the thermochromic performance | No significant changes in the thermochromic performance | No significant changes in the thermochromic performance | No significant changes in the thermochromic performance | No significant changes in the thermochromic performance |
| The thermochromic performance after naturally aging for 300 hours at | No significant changes in the thermochromic performance | No significant changes in the thermochromic performance | No significant changes in the thermochromic performance | No significant changes in the thermochromic performance | No significant changes in the thermochromic performance | No significant changes in the thermochromic performance | No significant changes in the thermochromic performance | No significant changes in the thermochromic performance |

TABLE 2-continued

Performance Test of Compositions Obtained in Embodiments 1-4

| | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|
| 25° C. after water absorption of resin Compressive strength of the product (detection by a particle strength tester) | 25N/particle, high in strength and not easy to be crushed | 27N/particle, high in strength and not easy to be crushed | 27N/particle, high in strength and not easy to be crushed | 33N/particle, high in strength and not easy to be crushed | 45N/particle, very high in strength and not easy to be crushed | 42N/particle, very high in strength and not easy to be crushed | 52N/particle, very high in strength and not easy to be crushed | 44N/particle, very high in strength and not easy to be crushed |

Comparative Examples 1-6

The comparative examples 1-6 belong to Embodiment 2, and the preparation method is same as Embodiment 2; see Table 3 for the comparison:

TABLE 3

Components and Contents Involved in the Comparative Examples 1-6

| | Comparative example 1 | Comparative example 2 | Comparative example 3 | Comparative example 4 | Comparative example 5 | Comparative example 6 |
|---|---|---|---|---|---|---|
| Monomer | 18% acrylic acid 2% acrylonitrile | Same as Embodiment 2 | Same as Embodiment 2 | Same as Embodiment 2 | Same as Embodiment 8 | 10.5% acrylic acid 12.5% N-vinyl pyrrolidone |
| Initiator | Same as Embodiment 2 | 0.3% AIBN | Same as Embodiment 2 | Same as Embodiment 2 | Same as Embodiment 8 | 0.2% ceric ammonium nitrate |
| Diluent | Same as Embodiment 2 | Same as Embodiment 2 | Same as Embodiment 2 | Same as Embodiment 2 | 24% glycerol | Same as Embodiment 8 |
| Dispersant | Same as Embodiment 2 | 0.5% OP-10 | Same as Embodiment 2 | 5% OP-10 | Same as Embodiment 8 | Same as Embodiment 8 |
| Cross-linking agent | Same as Embodiment 2 | Same as Embodiment 2 | 0.005% diethylene glycol dimethacrylate | 0% | 0.005% allyl methacrylate | Same as Embodiment 8 |
| Auxiliary | | | | | Same as Embodiment 8 | Same as Embodiment 8 |
| Thermochromic pigment | Same as Embodiment 2 | Same as Embodiment 2 | 11% color changes from yellow to colorless at 30° C. and the process is reversible upon temperature drop) | Same as Embodiment 2 | Same as Embodiment 8 | Same as Embodiment 8 |
| Deionized water (distilled water) | Balance | Balance | Balance | Balance | Balance | Balance |

See Table 6 for the performance test results of compositions in the comparative examples 1-4:

TABLE 4

| | Performance Test Results of Compositions in the Comparative Examples 1-6 | | | | | |
|---|---|---|---|---|---|---|
| | Comparative example 1 | Comparative example 2 | Comparative example 3 | Comparative example 4 | Comparative example 5 | Comparative example 6 |
| Color uniformity after water absorption of resin | Uneven color | Uniform color change | Uneven color | Uneven color | Uneven color | Uneven color |
| The thermochromic performance after water absorption of resin | Yellow when the ambient temperature is below 30° C., colorless when the ambient temperature is above 30° C. (not exceeding 90° C.) | Yellow when the ambient temperature is below 30° C., colorless when the ambient temperature is above 30° C. (not exceeding 90° C.) | Yellow when the ambient temperature is below 30° C., colorless when the ambient temperature is above 30° C. (not exceeding 90° C.) | Yellow when the ambient temperature is below 30° C., colorless when the ambient temperature is above 30° C. (not exceeding 90° C.) | Purple when the ambient temperature is below 0° C., blue when the ambient temperature is above 0° C. and below 30° C., red when the ambient temperature is above 30° C. and below 55° C. and colorless when the ambient temperature is above 55° C. (not exceeding 90° C.) | Purple when the ambient temperature is below 0° C., blue when the ambient temperature is above 0° C. and below 30° C., red when the ambient temperature is above 30° C. and below 55° C. and colorless when the ambient temperature is above 55° C. (not exceeding 90° C.) |
| The thermochromic performance after naturally aging for 100 hours at 25° C. after water absorption of resin | No significant changes in the thermochromic performance | No significant changes in the thermochromic performance | No significant changes in the thermochromic performance | No significant changes in the thermochromic performance | No significant changes in the thermochromic performance | No significant changes in the thermochromic performance |
| The thermochromic performance after naturally aging for 200 hours at 25° C. after water absorption of resin | No significant changes in the thermochromic performance | No significant changes in the thermochromic performance | No significant changes in the thermochromic performance | No significant changes in the thermochromic performance | No significant changes in the thermochromic performance | No significant changes in the thermochromic performance |
| The thermochromic performance after naturally aging for 300 hours at 25° C. after water absorption of resin | No significant changes in the thermochromic performance | No significant changes in the thermochromic performance | No significant changes in the thermochromic performance | No significant changes in the thermochromic performance | No significant changes in the thermochromic performance | No significant changes in the thermochromic performance |
| Change in mechanical properties of the product (detection | 15N/particle; compared with the embodiment, the compressive | 13N/particle; compared with the embodiment, the mechanical | 27N/particle; compared with the embodiment, no significant | 11N/particle; compared with the embodiment, the mechanical | 7N/particle; compared with the embodiment, the compressive | 8N/particle; compared with the embodiment, the mechanical |

TABLE 4-continued

Performance Test Results of Compositions in the Comparative Examples 1-6

|  | Comparative example 1 | Comparative example 2 | Comparative example 3 | Comparative example 4 | Comparative example 5 | Comparative example 6 |
|---|---|---|---|---|---|---|
| by a particle strength tester) | strength of the product is lowered | properties of product are reduced, and the product is easily broken | changes in the mechanical properties of the product | properties of product are reduced, and the product is pretty easily broken with water leakage | strength of the product is lowered and the product is easily broken. | properties of product are reduced, and the product is pretty easily broken with water leakage |

Comparative Examples 7-8

The comparative examples 7 and 8 belong to Embodiment 2; the components and contents are the same as Embodiment 2, except that the preparation method is different:

The difference between the comparative example 7 and Embodiment 2 lies in: the initiation temperature is set as 95° C.; the heat release of the system is increased, and the reaction rate is accelerated. The chromogenic performance of the formed gel is damaged, and the color change is not obvious.

The difference between the comparative example 8 and Embodiment 2 lies in: before using NaOH solution for regulating the system pH, the monomer, the stabilizer and thermochromic pigment are mixed. The chromogenic performance of the prepared gel is damaged, and the color distribution is uneven. There are agglomerates visible to the naked eye.

Specific embodiments of the present invention are described above. It shall be understood that the present invention is not limited to the above-mentioned specific embodiments, and those skilled in the art can make different variants and modifications within the scope of the claims, and it shall not affect the substance of the present invention.

What is claimed is:

1. A super absorbent thermochromic resin, consisting of following components by weight percent based on the total weight of the composition:

| | |
|---|---|
| a monomer, wherein the monomer is an acrylic monomer 30-60% | 30-60%; |
| an initiator | 0.01-0.5%; |
| a dispersant | 0.01-4%; |
| a cross-linking agent | 0.01-5%; |
| a diluent | 0-20%; |
| a reversible thermochromic microcapsule pigment/dye of water dispersion type | 0.1-10%; |
| an auxiliary | 0.5-2%; | and a balance of water;
wherein the auxiliary is at least one of inorganic salts and organic compounds: the inorganic salts comprise one or more of sodium tripolyphosphate, zinc sulfate, potassium aluminum sulfate, sodium chloride and potassium chloride, and the organic compounds comprise at least one of polyethylene glycol and polyethylene glycol glyceride.

2. The super absorbent thermochromic resin according to claim 1, wherein the thermochromic water-absorbent resin composition consists of the following components by weight percent:

| | |
|---|---|
| the acrylic monomer | 40-55%; |
| the initiator | 0.05-0.3%; |
| the dispersant | 0.4-3.5%; |
| the cross-linking agent | 0.1-4.5%; |
| the diluent | 0.4-15.8%; |
| the reversible thermochromic microcapsule pigment/dye of water dispersion type | 4-7.5%; |
| the auxiliary | 0.5-2%; | and the balance of water.

3. The super absorbent thermochromic resin according to claim 1, wherein the thermochromic water-absorbent resin composition consists of the following components by weight percent:

| | |
|---|---|
| the acrylic monomer | 40-55%; |
| the initiator | 0.05-0.3%; |
| the dispersant | 0.4-3.5%; |
| the cross-linking agent | 0.1-4.5%; |
| the diluent | 0.4-15.8%; |
| the reversible thermochromic microcapsule pigment/dye of water dispersion type | 4-7.5%; |
| the auxiliary | 0.5-2%; | and the balance of water.

4. The super absorbent thermochromic resin according to claim 1, wherein the initiator is selected from a group consisting of azobisisobutyronitrile, cerium salts, persulfate, a persulfate-NaHSO$_3$ system and a hydrogen peroxide-ascorbic acid system.

5. The super absorbent thermochromic resin according to claim 2, wherein the initiator is selected from a group consisting of azobisisobutyronitrile, cerium salts, persulfate, a persulfate-NaHSO$_3$ system and a hydrogen peroxide-ascorbic acid system.

6. The super absorbent thermochromic resin according to claim 1, wherein the dispersant is selected from a group consisting of sorbitan monostearate, sorbitan monooleate, polyoxyethylene sorbitan trioleate and OP-10 (nonylphenol polyoxyethylene ether-10).

7. The super absorbent thermochromic resin according to claim 2, wherein the dispersant is selected from a group consisting of sorbitan monostearate, sorbitan monooleate, polyoxyethylene sorbitan trioleate and OP-10.

8. The super absorbent thermochromic resin according to claim 1, wherein the cross-linking agent is selected from a group consisting of ethylene glycol dimethacrylate, diethylene glycol dimethacrylate, allyl methacrylate, 1,1,1-trimethylolpropane acrylate, triallylamine, N,N'-methylene diacrylamide and tetraallyloxyethane.

9. The super absorbent thermochromic resin according to claim 2, wherein the cross-linking agent is selected from a group consisting of ethylene glycol dimethacrylate, diethylene glycol dimethacrylate, allyl methacrylate, 1,1,1-trimethylolpropane acrylate, triallylamine N,N'-methylene diacrylamide and tetraallyloxyethane.

10. The super absorbent thermochromic resin according to claim 1, wherein the diluent is a polyhydric alcohol.

11. The super absorbent thermochromic resin according to claim 2, wherein the diluent is a polyhydric alcohol.

12. A preparation method of a super absorbent thermochromic resin of claim 1, wherein the preparation method comprises following steps of: adding a reversible thermochromic microcapsule pigment/dye of water dispersion type, a dispersant, a cross-linking agent, an auxiliary and a diluent to an acrylic monomer and mixing uniformly; adjusting a pH value, and adding an initiator; mixing uniformly to form a reaction system, controlling a reaction temperature, time and speed to perform reaction, and obtaining the super absorbent thermochromic resin.

13. The preparation method of the super absorbent thermochromic resin according to claim 12, wherein the reaction comprises solution polymerization or inverse suspension polymerization.

14. The preparation method of the super absorbent thermochromic resin according to claim 12, wherein the pH value after being adjusted is 5-8; the reaction temperature is controlled between 55-90° C.

* * * * *